(12) United States Patent
Beckmann

(10) Patent No.: US 7,141,194 B1
(45) Date of Patent: Nov. 28, 2006

(54) HOLLOW SECTION WITH INTERNAL REINFORCEMENT AND METHOD OF PRODUCING THE HOLLOW SECTION

(75) Inventor: Friedhelm Beckmann, Hiddenhausen (DE)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/666,951

(22) Filed: Sep. 20, 2000

Related U.S. Application Data

(63) Continuation of application No. PCT/DE99/00700, filed on Mar. 15, 1999.

(30) Foreign Application Priority Data

Mar. 20, 1998 (DE) ................ 198 12 288
Dec. 7, 1998 (DE) ................ 198 56 255

(51) Int. Cl.
*F16S 1/00* (2006.01)
*B62D 25/00* (2006.01)

(52) U.S. Cl. ................ 264/46.6; 296/187.02

(58) Field of Classification Search ........... 428/34.1; 264/46.6, 271.1, 275, 279, 279.1, 45.3, 42, 264/46.5; 296/187.02
See application file for complete search history.

(56) References Cited

U.S. PATENT DOCUMENTS

| | | | | |
|---|---|---|---|---|
| 5,160,465 A | * | 11/1992 | Soderberg | 264/46.5 |
| 5,194,199 A | * | 3/1993 | Thum | 264/46.6 |
| 5,575,526 A | | 11/1996 | Wycech | |
| 5,884,960 A | | 3/1999 | Wycech | |
| 6,068,424 A | | 5/2000 | Wycech | |

FOREIGN PATENT DOCUMENTS

| | | |
|---|---|---|
| DE | 42 03 460 A1 | 8/1992 |
| DE | 4227393 | 8/1992 |
| DE | 19648164 | 5/1998 |
| DE | 198 56 255 C1 | 1/2000 |
| EP | 0 383 498 A2 | 8/1990 |
| EP | 0 775 721 A1 | 5/1997 |
| FR | 2 749 263 A1 | 12/1997 |
| JP | 58-87668 | * 12/1981 |
| JP | 58-87668 | 6/1983 |
| JP | 2276836 | 11/1990 |

(Continued)

OTHER PUBLICATIONS

International Publication No. WO 97/43501 (Wycech), dated Nov. 20, 1997.

R. Lambourne (ed.): "Paint and Surface Coatings: Theory andPractice", *Ellis Horwood Limited, Publishers*, Chichester, 1987, pp. 434-444.

(Continued)

*Primary Examiner*—C. Melisssa Koslow
(74) *Attorney, Agent, or Firm*—Dobrusin & Thennisch PC

(57) ABSTRACT

The hollow profiles with inner reinforcement are especially suited for use in automobile bodies. The aim of the invention is to ensure that an anti-corrosion medium reaches all areas and to obtain rigidity in a hollow structure without increasing the weight of the profile or enlarging its cross-section. To this end, a solid core material is coated with an activable material and an outer panel is arranged in such a way as to form a hollow space which can be filled through the foaming action of the activable material. The size of this hollow space is determined by how the spacers are determined and by how the spacers are arranged, depending on the particular application. The solid core material consists of a foamed or non-foamed metallic material or of a synthetic material reinforced with metal fibers, carbon fibers or glass fibers.

1 Claim, 2 Drawing Sheets

FOREIGN PATENT DOCUMENTS

| | | |
|---|---|---|
| JP | 7-31569 | 2/1995 |
| JP | 7-117728 | 5/1995 |
| WO | WO-93/05103 * | 3/1993 |
| WO | 95/32110 | 11/1995 |
| WO | 96/37400 | 11/1996 |
| WO | 98/21060 | 5/1998 |
| WO | 99/39882 | 8/1999 |

OTHER PUBLICATIONS

"Surface Vehicle Information Report", *SAE The Engineering Society For Advancing Mobility Land Sea Air and Space International, SAE J447*, revised Jul. 1995, pp. 1-64.

Hall, W. H., Cathodic Electrocoat in the Australian Automotive Industry, Australian OCCA Proceedings and News, Apr. 1980, pp. 4-7.

* cited by examiner

HOLLOW SECTION WITH INTERNAL REINFORCEMENT AND METHOD OF PRODUCING THE HOLLOW SECTION

CROSS-REFERENCE TO RELATED APPLICATION

This is a continuation of copending International Application PCT/DE99/00700, filed Mar. 15, 1999, which designated the United States.

BACKGROUND OF THE INVENTION

Field of the Invention

The invention relates to a hollow section with internal reinforcement, especially hollow sections as are defined within structural framework for use in car bodies, as well as a method of producing the hollow section.

In mechanical engineering, and also especially in car manufacture, punched and preshaped plate sections are welded together to form a double shell. Adequate resistance torques and bending strengths of the hollow sections thus resulting can be achieved only if the plate cross sections are enlarged accordingly or the plate wall thickness is increased. An enlargement of the cross sections results, especially in motor vehicles, in a change in the internal or external dimensions, and an increase in the wall thickness results in an undesirable additional weight. Another possibility for reinforcing hollow sections is to strengthen them with ribbed sections. In the case of hollow sections which are to be given an internal corrosion protection, ribbed sections are, however, unsuitable if a desired protective layer, as is customary with car bodies, is produced by the dipping method, because the ribbed sections prevent the corrosion protection agent from reaching all parts of the internal sections or form undesirable pockets.

German published patent application DE 42 27 393 A1 purports to have achieved a reduction in the corrosion susceptibility of the metal of the hollow body in the region of the space enclosed thereby. To this end, inter alia, an electrically conductive layer made from a sacrificial metal or from a foil is inserted, this layer being caused to lie against the inner surface of the hollow body by foaming a material encasing the core. This publication provides no indication of how an internal reinforcement suitable for absorbing forces can be achieved in the case of hollow sections.

The foam-filling of hollow parts to improve mechanical resistance to deformation is known from German published patent application DE 196 35 734 A1. The hollow parts concerned are primarily seamless or welded pipes, which can be reshaped if desired. No special measures for reducing susceptibility to corrosion are indicated.

SUMMARY OF THE INVENTION

The object of the invention is to provide a hollow section, particularly a section formed by vehicle framework sheet metal that is enclosed by an opposing sheet metal, and a corresponding production method which overcomes the above-noted deficiencies and disadvantages of the prior art devices and methods of this kind, and wherein a corrosion protection medium can reach all areas of the hollow section and a high degree of rigidity can be achieved without a substantial increase in weight or enlargement of the cross section.

With the above and other objects in view there is provided, in accordance with the invention, a method of producing a hollow section with internal reinforcement, and particularly an automotive vehicle body structure having a hollow section defined therein, which comprises:

coating a solid core material with activatable polymeric material;

enclosing the solid core material and the activatable polymeric material with an outer plate to form an assembly with a defined cavity inside the outer plate;

passing the assembly to a corrosion treatment bath and subjecting all interior areas of the assembly to a corrosion protection agent; and subsequently passing the assembly to a drying oven for initiating foaming of the activatable polymeric material and filling the cavity defined cavity with the activatable polymeric material.

In other words, the objects of the invention are satisfied with a hollow section having internal reinforcement, especially for use in car bodies, in which a core material is coated with activatable polymeric material and an outer plate is disposed to form a cavity, the size of the cavity being such that it can be completely filled by the operation of foaming the activatable material, and the solid core material being formed from a foamed or unfoamed metallic material or from a synthetic material reinforced with metal fibers, carbon fibers or glass fibers. The possibility exists of forming the solid core material with a flexurally rigid hollow section. Advantageously, the solid core material is coated with the activatable polymeric material only in some areas.

According to the invention, the core material and the outer material used for coating are formed from a reinforcing and/or an energy-absorbing foam system and/or an acoustic foam. In an embodiment of the invention, the core material is formed from an energy-absorbing material and the outer material used for coating is formed from a reinforcing material and/or an acoustic foam. In an alternative embodiment of the invention, the core material is formed from a reinforcing material and the outer material used for coating is formed from an energy-absorbing material and/or an acoustic foam. The possibility exists of forming the core material from an acoustic foam and the outer material used for coating from a reinforcing and/or energy-absorbing material.

A method according to the invention is wherein the hollow section, before the operation of foaming the activatable material, is passed to a corrosion protection dipping bath and the corrosion protection agent reaches all areas of the inner section and the hollow section is then passed to a drying oven.

With the above and other objects in view there is also provided, in accordance with the invention, a hollow section, comprising:

a solid core material formed of a material selected from the group consisting of foamed metallic material, unfoamed metallic material, synthetic material reinforced with fibers selected from the group consisting of metal fibers, carbon fibers, and glass fibers, and a hollow section;

activated, foamed material on the solid core material;

an outer plate enclosing the solid core material, with the foamed material at least partly filling a defined cavity between the solid core material and the outer plate;

the solid cover material, the foamed material, and the outer plate being corrosion treated with a corrosion protection agent and subsequent drying.

In accordance with a concomitant feature of the invention, temperature for the coating of the solid core material provided with the activatable material is kept lower than the stoving temperature for the anticorrosion layer in the drying oven. In a further embodiment of the invention, a reaction of the activatable material is deliberately initiated in the drying oven as a result of the higher temperature and the cavity originally deliberately formed between the activatable material and the outer plate is filled by the foam which forms.

Other features which are considered as characteristic for the invention are set forth in the appended claims.

Although the invention is illustrated and described herein as embodied in a hollow section with internal reinforcement and method for producing this hollow section, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
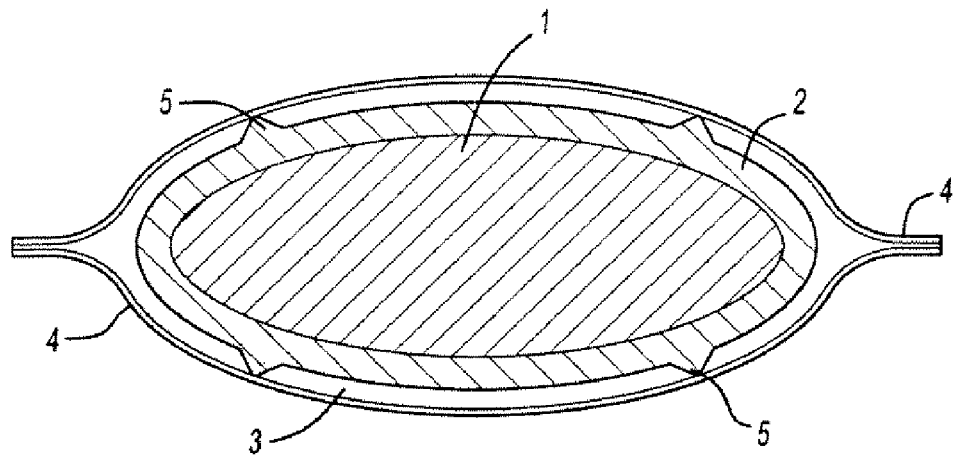
FIG. 1 is a diagrammatic section view of a hollow section before foaming of the activatable polymeric material.
Figure 2:
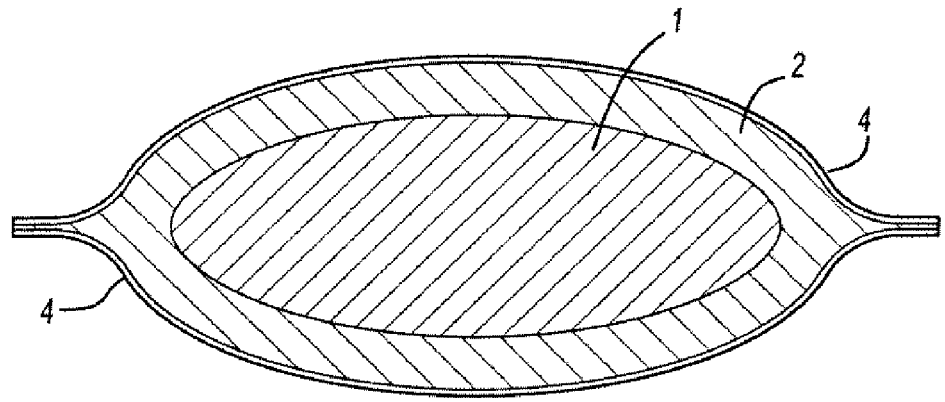
FIG. 2 is a similar view of the structure after foaming of the activatable polymeric material.
Figure 3:
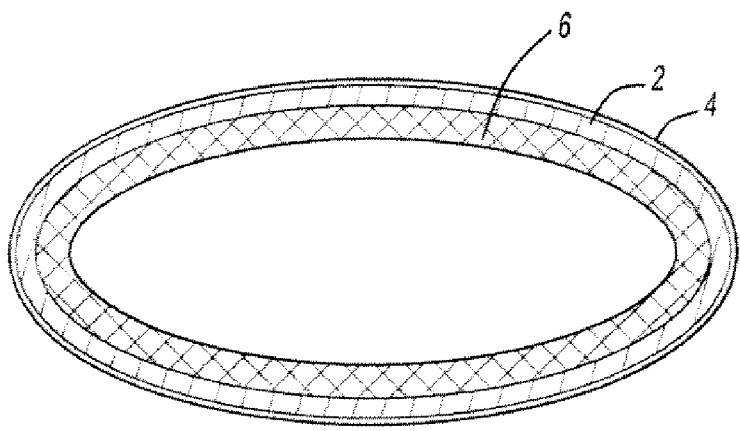
FIG. 3 is a diagrammatic section view of the structure similar to that of FIG. 1, but here with a solid core material in the form of a solid shaped body with a cavity.

Referring now to the figures of the drawing in detail and first, particularly, to FIG. 1 thereof, there is seen a solid core material 1 coated with an activatable material 2. An outer plate 4 is disposed to form a cavity 3. The cavity 3 is completely filled by the operation of foaming the activatable material 2. The size of the cavity 3 is predetermined in accordance with the particular application. For this purpose, spacers 5 (as part of the coating 2) are used and, according to FIG. 1, are disposed on the inside of the outer plate 4. According to FIG. 3, the solid core material 1 is formed by a flexurally rigid hollow section 6.

Before the foaming operation, the hollow section 6 is passed to a corrosion protection dipping bath. Because the inside of the outer plate 4 is still freely accessible in this condition, the corrosion protection agent can reach all areas of the inner section. The coating of the core material 1 takes place at a temperature which is lower than the stoving temperature for the anticorrosion layer applied in the drying oven. This higher temperature in the drying oven results in drying of the anticorrosion layer and a reaction of the coating material, as a result of which the foaming operation is initiated and the cavity 3 which has been deliberately formed is filled with foam.

Figure 4A:
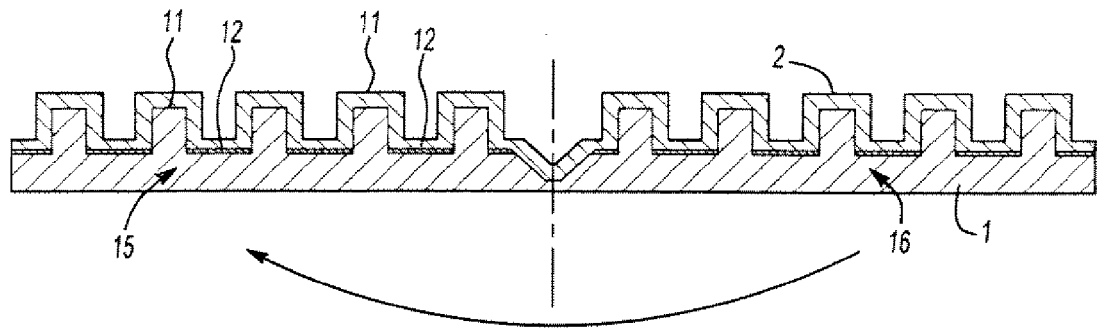
FIGS. 4A to 4D are various section and partly perspective views of various alternative embodiments of sections coated with foamable polymeric material.
Figure 4B:
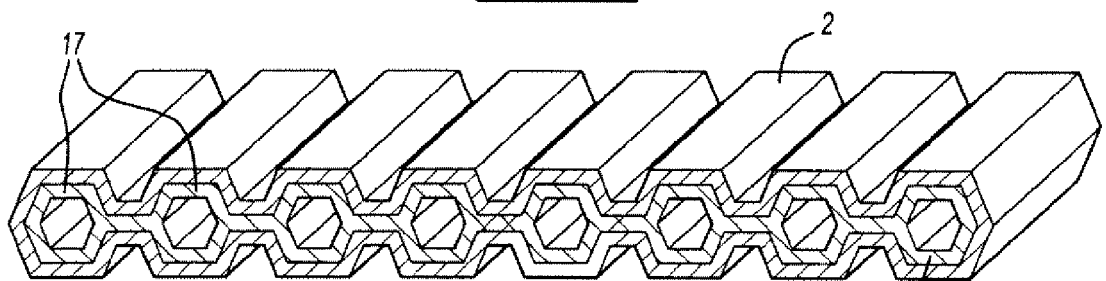
Figure 4C:
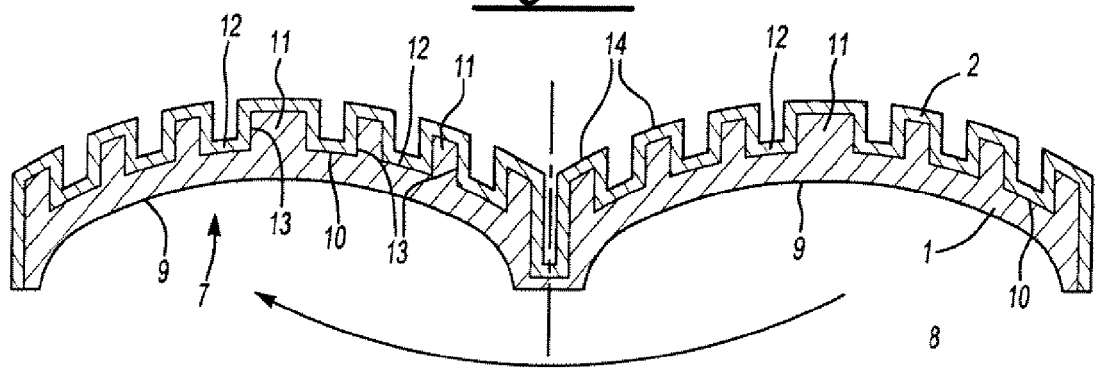
Figure 4D:
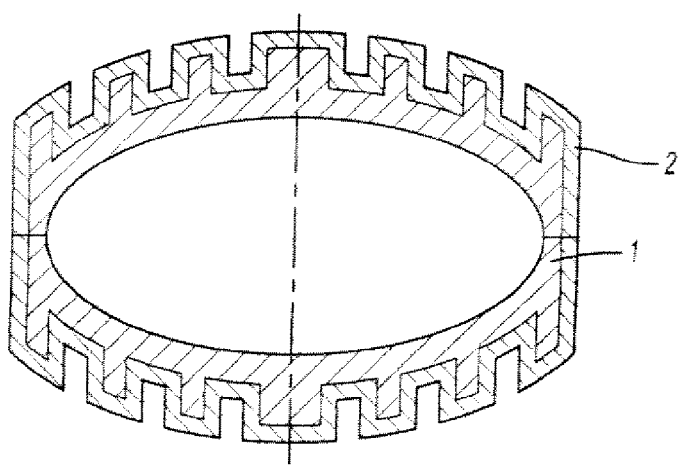

Turning to FIGS. 4C and 4D, those drawings depict a method of reinforcing a automotive vehicle structure having a hollow section comprising the steps of:

a) coating a solid core material with an activatable polymeric material of generally uniform thickness, wherein the sold core material 1 is characterized by a profile that includes a first semielliptical portion 7 and a second adjoining semielliptical portion 8, each of the first semi-elliptical portion and the second semi-elliptical portion having a smooth and continuous concave first surface 9 and an opposing convex outer surface 10, the outer convex surface further being characterized by a plurality of projecting peaks 11 and valleys 12, the peaks and valleys each including parallel side walls 13 and an upper surface 14 that is generally parallel to the concave first surface;

b) folding the first and second semielliptical portions relative to each other about an axis where the portions adjoin each other, for forming an elliptical inner surface having a major axis, so that the side walls defining the peaks and valleys of the outer convex surface are orthogonally oriented relative to the major axis;

c) enclosing the solid core material and the activatable polymeric material within the hollow section of the automotive vehicle structure;

d) passing the assembly to a corrosion treatment bath and subjecting the assembly to a corrosion protection agent; and e) subsequently passing the assembly to a drying oven for drying the corrosion protection agent and for initiating foaming of the activatable polymeric material and filling the defined cavity with the activatable polymeric material.

FIG. 4A illustrates a construction consistent with that of FIGS. 4C and 4D, but having foldable flat portions 15 and 16 instead of the semilliptical portions.

FIG. 5A illustrates a construction by which a plurality of adjoining hexagonal sections 17 are covered with activatable material 2.

I claim:

1. A method of reinforcing a automotive vehicle structure having a hollow section comprising the steps of:

a) coating a solid core material with an activatable polymeric material of generally uniform thickness, wherein the sold core material is characterized by a profile that includes a first semielliptical portion and a second adjoining semielliptical portion, each of the first semi-elliptical portion and the second semi-elliptical portion having a smooth and continuous concave first surface and an opposing convex outer surface, the outer convex surface further being characterized by a plurality of projecting peaks and valleys, the peaks and valleys each including parallel side walls and an upper surface that is generally parallel to the concave first surface;

b) folding the first and second semielliptical portions relative to each other about an axis where the portions adjoin each other, for forming an elliptical inner surface having a major axis, so that the side walls defining the peaks and valleys of the outer convex surface are orthogonally oriented relative to the major axis;

c) enclosing the solid core material and the activatable polymeric-material within the hollow section of the automotive vehicle structure;

d) passing the assembly to a corrosion treatment bath and subjecting the assembly to a corrosion protection agent; and e) subsequently passing the assembly to a drying oven for drying the corrosion protection agent and for initiating foaming of the activatable polymeric material and filling the defined cavity with the activatable polymeric material.

* * * * *

UNITED STATES PATENT AND TRADEMARK OFFICE
CERTIFICATE OF CORRECTION

PATENT NO. : 7,141,194 B1
APPLICATION NO. : 09/666951
DATED : November 28, 2006
INVENTOR(S) : Friedhelm Beckmann It is certified that error appears in the above-identified patent and that said Letters Patent is hereby corrected as shown below:

TITLE PAGE, ITEM (56)
Page 2 Foreign Patent Documents
 add --WO 97/43501 11/1997--.

Signed and Sealed this

Eighteenth Day of March, 2008

JON W. DUDAS
*Director of the United States Patent and Trademark Office*